United States Patent
Katoh

(10) Patent No.: US 6,232,620 B1
(45) Date of Patent: May 15, 2001

(54) ACTIVE MATRIX TYPE TFT ELEMENTS ARRAY HAVING PROTRUSION ON GATE LINES

(75) Inventor: Takuya Katoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/186,285

(22) Filed: Nov. 5, 1998

(30) Foreign Application Priority Data

Nov. 7, 1997 (JP) .................................................. 9-322161

(51) Int. Cl.⁷ ...................................................... H01L 29/00
(52) U.S. Cl. ............... 257/59; 257/72; 257/347; 257/348; 257/349; 257/350; 257/351; 257/352; 257/353; 349/139; 349/142
(58) Field of Search ....................... 257/59, 72, 347–353; 349/139, 142

(56) References Cited

U.S. PATENT DOCUMENTS 5,737,049 * 4/1998 Shin et al. ............................. 257/59
5,926,235 * 6/1999 Han et al. ............................. 257/59

FOREIGN PATENT DOCUMENTS 62-171142   7/1987 (JP) .

* cited by examiner

Primary Examiner—Fetsum Abraham
(74) Attorney, Agent, or Firm—Sughrue, Mion, Zinn, Macpeak & Seas, PLLC

(57) ABSTRACT

Active matrix TFT elements array in which the number of production steps is not increased and the high production yield can be achieved. A semiconductor film is formed by patterning in an elongated island shape between pixel electrodes disposed neighboring to each other in the direction of drain lines to provide a protrusion to prevent shorting across the pixel electrodes even if photoresist film residuals are produced.

14 Claims, 9 Drawing Sheets

ACTIVE MATRIX TYPE TFT ELEMENTS ARRAY HAVING PROTRUSION ON GATE LINES

FIELD OF THE INVENTION

This invention relates to an active matrix type TFT elements array and, more particularly, to an active matrix type TFT elements array provided on an insulating substrate and which can be conveniently used for an active matrix type liquid crystal display.

BACKGROUND

There is an increasing demand for a liquid crystal display. In particular, the demand for an active matrix type liquid crystal display, in which thin film field-effect transistors are arrayed as switches for respective pixels on a glass substrate, is rapidly increasing because of its high picture quality.

FIG. 7 illustrates the structure of a conventional thin film field-effect transistor elements array used in an active matrix type liquid crystal display. Specifically, FIG. 7a is a plan view, FIG. 7b is a cross-sectional view taken along line A–A' of FIG. 7a and FIG. 7c is a cross-sectional view taken along line B–B' of FIG. 7b.

In FIGS. 7(a–c) show a thin film field-effect transistor, in which a gate metal film 2, a drain metal film 6a and indium tin oxide (ITO) films 8a, 8b operate as a control line, a signal line and pixel electrodes, respectively. The ITO film 8a is connected via a contact hole 9 to a drain metal film 6b. The thin film field-effect transistor is a thin film transistor of an inverted staggered structure having an amorphous silicon semiconductor film 4a and a n+ amorphous silicone film 5.

The above-described conventional thin film field-effect transistor elements array has the following disadvantages:

FIGS. 8a to 8d are step by step cross-sectional views taken along line B–B' of FIG. 9 for illustrating a process in which residuals of a photoresist film are produced during patterning of the ITO film 8, and FIG. 9 is a plan view thereof.

Referring to FIG. 8a, the gate metal film 2 is formed and patterned on the light-transmitting insulating substrate 1, and subsequently a gate insulating film 3 is formed. Although not shown in FIG. 8, the drain metal film is subsequently formed and patterned, and an insulating film 7 then is formed.

Referring to FIG. 8b, an ITO film 8 is formed, and subsequently a photoresist film 10 is formed.

Referring to FIG. 8c, residuals 11 of the photoresist film are sometimes formed at the time of light exposure and development.

In this case, if the ITO film 8 is etched, the ITO film 8 is not etched, such that, if the photoresist film 10 is removed, the ITO film 8a and the ITO film 8b are not removed and remain connected, as shown in FIG. 8d.

According to the inventor's view, this is the state in which the pixel electrodes in the longitudinal direction remain connected, as shown in FIG. 9. If an active matrix display is formed using this transistor elements array, there are produced flaws of two consecutive pixels, thus significantly lowering the production yield.

As a method for prohibiting shorting on occurrence of photoresist film residuals, there is proposed in e.g., JP Patent Kokai JP-A-62-1711442 (1987) an interconnection forming method for semiconductor elements in which protrusions are formed in the insulating film between contact holes to produce random light scattering in a resist overlying the edges of the protrusions to permit strong light exposure of the edges of the light-exposed portions of the resist, and thus eliminating resist residuals to prevent shorting between the lines. FIG. 10 shows a corresponding cross-sectional view, in which an element 13 is formed on a semiconductor substrate 12 and an insulating film 14 is formed thereon. At a mid portion of the neighboring elements is formed a protrusion 15 in the insulating film for connecting lines 16a, 16b via contact holes to the elements 13, respectively.

If, in this structure, photoresist film residuals are produced between the lines 16a, 16b during patterning the lines 16a, 16b, the photoresist film is hardly left on the protrusion in the insulating film such that the metal film of the lines is not left on the protrusion in the insulating film. Therefore, the lines 16a, 16b are separated from each other, thus prohibiting the lowering of the production yield due to shorting of the lines.

According to the inventor's view, however, in the method shown in FIG. 10, one lithographic step is added for providing the protrusion in the insulating film, thus increasing the number of production steps.

As another method for prohibiting shorting on occurrence of photoresist film residuals, there is proposed in JP Patent Kokai JP-A-7-234419 (1995) a thin film transistor substrate having a groove surrounding the pixel electrode, as shown in the cross-sectional view of FIG. 11.

Referring to FIG. 11, an insulating film 18 is formed on the light-transmitting insulating substrate 17. An ITO film is formed and patterned, after forming a groove 19. During this patterning an ITO film 20a and an ITO film 20b are designed inherently to be separated from each other.

If photoresist film residuals are generated in the thin film transistor substrate, shown in FIG. 11, the ITO film 20a and the ITO film 20b are separated from each other at the portion of the groove 19, as a result of which the production yield can be prevented from being lowered.

According to the inventor's view, however, in this structure, one lithographic step is added for providing the groove 19, thus increasing the number of production steps.

As discussed above, the conventional technique has the following disadvantages:

The first disadvantage is that the production yield is lowered in the conventional technique explained with reference to FIGS. 7 to 9.

The reason is that, during patterning of the photoresist, film residuals are created an, the ITO film is not separated, thus producing flaws in two neighboring consecutive pixels.

The second disadvantage is that the number of production steps is increased in the conventional technique explained with reference to FIGS. 10 and 11.

The reason is that one lithographic step is added in the line forming method of FIG. 10 for forming the protrusion, and for forming the groove in the thin film transistor substrate shown in FIG. 11.

SUMMARY OF THE DISCLOSURE

In view of the above-mentioned disadvantages of the conventional technique, it is an object of the present invention to provide an active matrix type TFT elements array without increasing the number of process steps and without lowering the production yield.

For accomplishing the above object according to one aspect of the present invention, there is provided an active matrix TFT elements array having gate lines, drain lines, amorphous silicon thin film field-effect transistors and pixel electrodes on a light-transmitting insulating substrate, the drain lines being formed in an upper layer compared with the gate lines, the array characterized in that an amorphous silicon semiconductor film of the same layer as an amorphous silicon semiconductor film constituting the amorphous silicon thin film field-effect transistor is provided in the shape of an island of a length not longer than an interval between adjacent drain lines on the gate lines between pixel electrodes disposed adjacent each other along a lengthwise direction of the drain lines.

According to a second aspect, generally, there is provided an active matrix TFT elements array wherein a protrusion is formed, between pixel electrodes disposed neighboring to each other along the direction of the drain lines, so as to leave a pattern of an elongated semiconductor film.

According to a third aspect, there is provided an active matrix TFT elements array in which signal lines and control lines are arranged in a lattice configuration on an insulating substrate, a first signal electrode is connected to the signal lines at an intersection of the signal lines and control lines, thin film transistors having gate electrodes connected to the control lines and each having a semiconductor layer, and pixel electrodes connected to second signal electrodes of the thin film transistors, wherein a protrusion is formed as an elongated island-like pattern on the control line between pixel electrodes disposed neighboring to each other along the direction of the signal lines, with interposition of an insulating film, for extending along the control lines.

In this active matrix TFT elements array, the semiconductor layer is of the same layer as the semiconductor layer constituting the thin film transistors, and the insulating film is of the same layer as the gate insulating film of the thin film transistors.

The length of the island-like pattern along the control lines is shorter than the interval between the neighboring signal lines.

The thin film transistors are transistors of an inverted staggered structure containing an amorphous silicon semiconductor film.

It is naturally assumed that the active matrix TFT elements array may be assembled to form an ultimate display having further devices.

PREFERRED EMBODIMENTS

In the following, preferred modes of carrying out the invention are explained. In a preferred mode of the present invention, there is provided an active matrix TFT elements array having gate lines, drain lines, amorphous silicon thin film field-effect transistors and pixel electrodes on a light-transmitting insulating substrate. The drain lines are formed in a layer lying above the gate lines. An amorphous silicon semiconductor film (4c of FIGS. 1 and 3) of the same layer as an amorphous silicon semiconductor film constituting the amorphous silicon thin film field-effect transistor is provided in the shape of an island. Its length is not longer than a separation distance (interval) between the drain lines film 4c formed on the gate lines (2 of FIGS. 1 and 3) between pixel electrodes (8a, 8b of FIGS. 1 and 3) disposed, neighboring to each other, along the direction of the drain lines.

Generally, the island extends substantially throughout the entire length of the gate line disposed in the interval between the drain lines.

In the mode of exploiting the present invention, a protrusion is formed by providing amorphous silicon between the pixel electrodes disposed neighboring to each other along the direction of drain lines, so that, if photoresist film residuals are produced during patterning of the ITO film constituting the pixel electrodes, the photoresist film is less likely to be left on the protrusion thus preventing shorting across the neighboring pixel electrodes for suppressing the lowering of the production yield.

Moreover, in the preferred mode of exploiting the present invention, since the amorphous silicon semiconductor film can be formed simultaneously as components of the thin film transistors, the number of production steps is not increased.

BRIEF DESCRIPTION OF THE DRAWINGS

FIG. 7 illustrates the structure of the first conventional technique, wherein

PREFERRED EMBODIMENTS OF THE INVENTION

For further explanation of the above modes of exploiting the invention, preferred embodiments of the invention will be explained with reference to the drawings.

Figure 1:
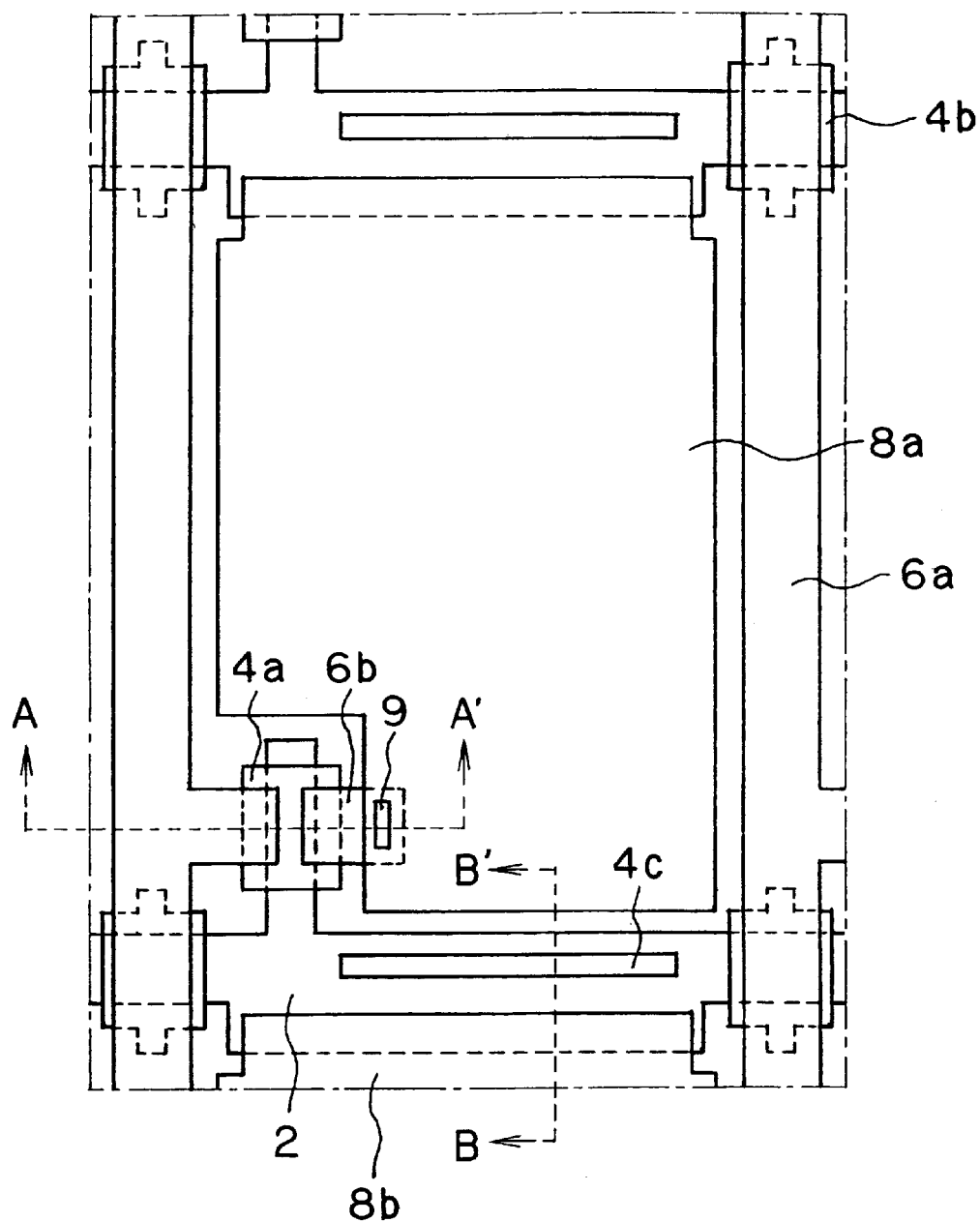
FIG. 1 is a plan view showing the structure of an embodiment of the present invention.
Figure 2:
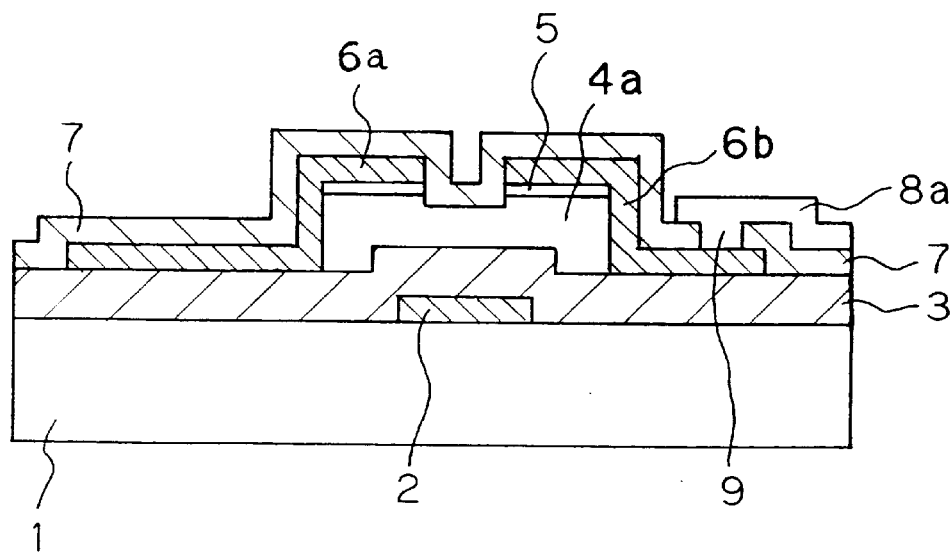
FIG. 2 is a cross-sectional view taken along line A–A' of FIG. 1.
Figure 3:
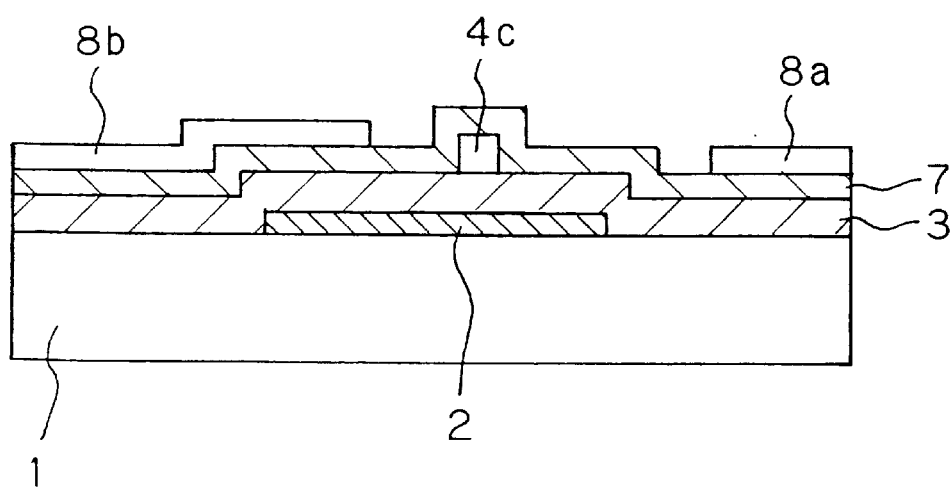
FIG. 3 is a cross-sectional view taken along line B–B' of FIG. 1.

FIG. 1 is a plan view for illustrating the present invention, FIG. 2 is a cross-sectional view taken along line A–A' in FIG. 1 and FIG. 3 is a cross-sectional taken along line B–B' in FIG. 1.

Referring to FIGS. 1 to 3, showing an embodiment of the present invention, there is formed on a light-transmitting insulating substrate 1 a gate metal film 2 to constitute a control line for gate electrodes and the elements array of the thin film field-effect transistors. On the opposite side of a gate insulating film 3 an amorphous silicon semiconductor film 4a and a $n^+$ amorphous silicon film 5 are formed in this order so as to serve as an active layer and as an ohmic layer of the thin film field-effect transistor, respectively. There are formed drain metal films 6a, 6b in contact with the $n^+$ amorphous silicon film 5, with the drain metal film 6a being unified with a signal line of the elements array. There are also formed an insulating film 7 and ITO films 8a, 8b, with the ITO film 8a being connected via a contact hole 9 to the drain metal film 6b. The ITO films 8a, 8b, operate as pixel electrodes.

An amorphous silicon semiconductor film 4b, present at a point of intersection of the gate metal film 2 constituting the control line and the drain metal film 6a constituting the signal line, is provided for improving the dielectric strength between the gate metal film 2 and the drain metal film 6a.

An amorphous silicon semiconductor film 4c is formed in the shape of an elongated island along the gate metal film 2 constituting the control line. By the presence of the resultant protrusion as shown, for example, above 4c in FIG. 3 it is possible to suppress lowering of the production yield caused by shorting between the ITO film 8a and the ITO film 8b.

The production process for the embodiment of the present invention is now explained. FIGS. 4a to 4e are cross-sectional process diagrams for illustrating the embodiment of the invention step-by-step and are cross-sectional views taken along line B–B' of FIG. 1.

Figure 4A:
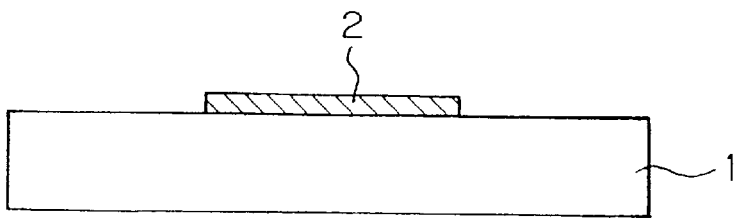
FIGS. 4(a) to 4(e) is a cross-sectional view for illustrating the production process of the embodiment of the present invention step-by-step.

The gate metal film 2, formed of Cr, is formed to a film thickness of the order of 100 nm on the light-transmitting insulating substrate 1, and patterned, as shown in FIG. 4a.

Figure 4B:
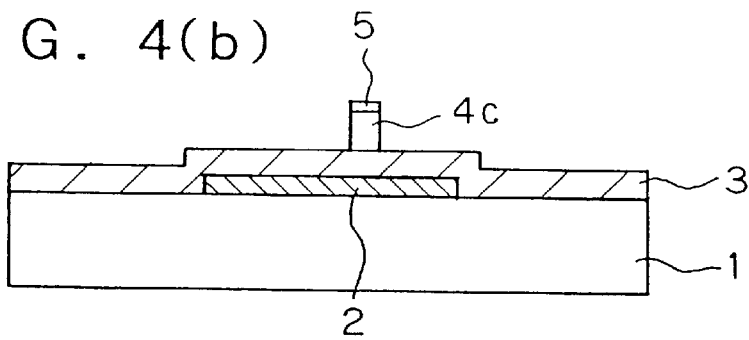

The gate insulating film 3, constituted by a silicon nitride film or a silicon oxide film, is formed to a thickness of the order of 300 nm, as shown in FIG. 4b. An amorphous silicon semiconductor film 4 (4a,4b,4c) is then formed to a film thickness of the order of 300 nm and subsequently a $n^+$ amorphous silicon film 5 is formed to a film thickness of the order of 50 nm followed by patterning. This patterning is carried out simultaneously as the patterning of the active layer of the thin film field-effect transistor.

Then, in an area outside that shown in FIG. 4, the drain metal films 6a, 6b formed of Cr, for example, are patterned to a thickness of the order of 100 nm (see FIG. 2).

Figure 4C:
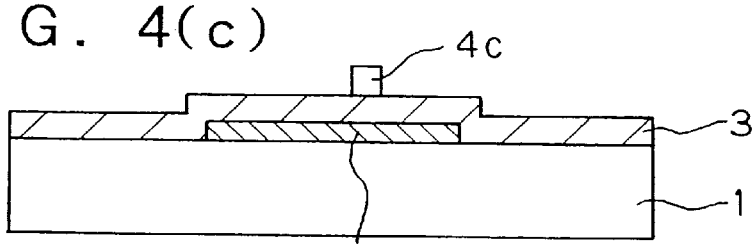

The $n^+$ amorphous silicon film 5 constituting an ohmic layer of the thin film field-effect transistor, is then etched to form an elongated island-like pattern of an amorphous silicon semiconductor film 4c, as shown in FIG. 4c.

Figure 4D:
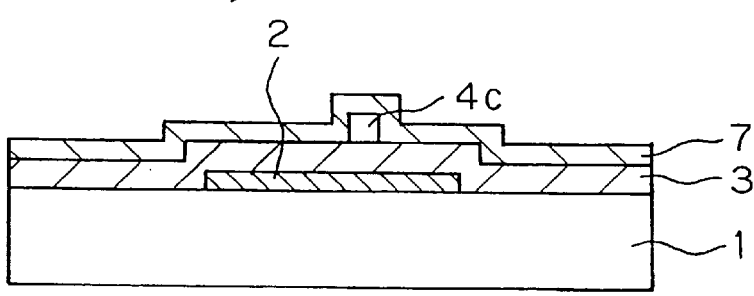
Figure 4E:
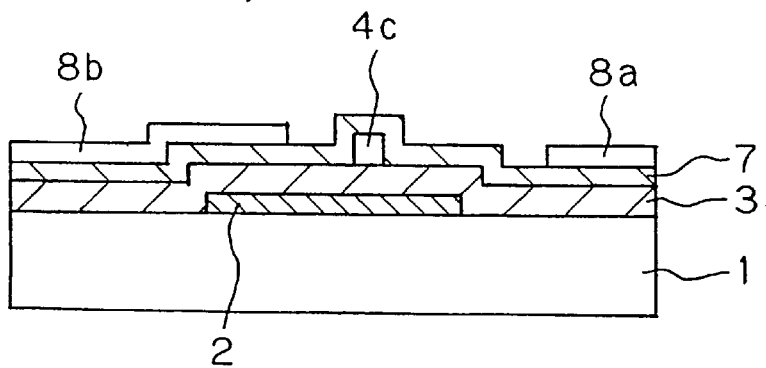

The insulating film 7, constituted as silicon nitride or silicon oxide film, is formed to a thickness of the order of 200 nm, as shown in FIG. 4d. The contact hole 9 (see FIGS. 1 and 2) is then formed outside the illustrated area as shown in FIG. 4e and an ITO film is formed to a thickness of the order of 100 nm. The ITO films 8a, 8b then are subjected to patterning.

This completes an active matrix TFT elements array embodying the present invention.

The ITO films 8a, 8b constitute pixel arrays disposed adjacent each other along the direction of the drain line. By the provision of the amorphous silicon semiconductor film 4c, it is possible to suppress the lowering of the production yield due to shorting across the neighboring pixel electrodes.

It is now explained in further details how an embodiment of the present invention has the structure of suppressing the lowering of the production yield. FIGS. 5a to 5d are cross-sectional views, taken along line B–B' of FIG. 1, for illustrating the production process in which photoresist film residuals are produced during patterning of the ITO film. FIG. 6 is a plan view thereof.

The production process is the same up to formation of the insulating film 7 (see FIG. 4d) as the above-described production process.

Figure 5A:
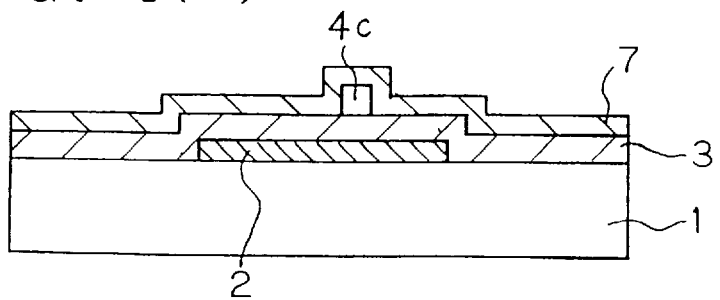
FIGS. 5(a) to 5(d), illustrating the operation and the meritorious effects of the embodiment of the present invention, is a cross-sectional view for illustrating the production process thereof.
Figure 5B:
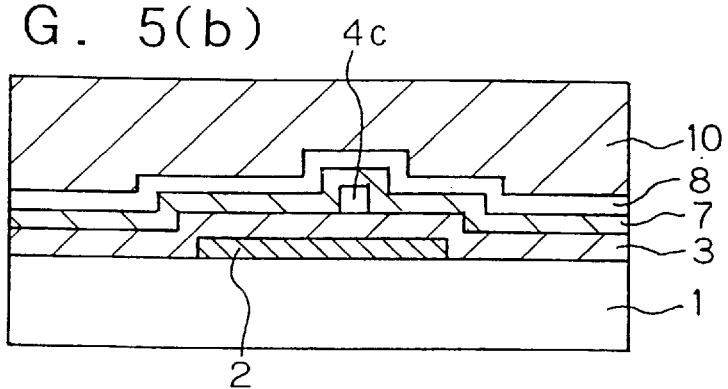
Figure 5C:
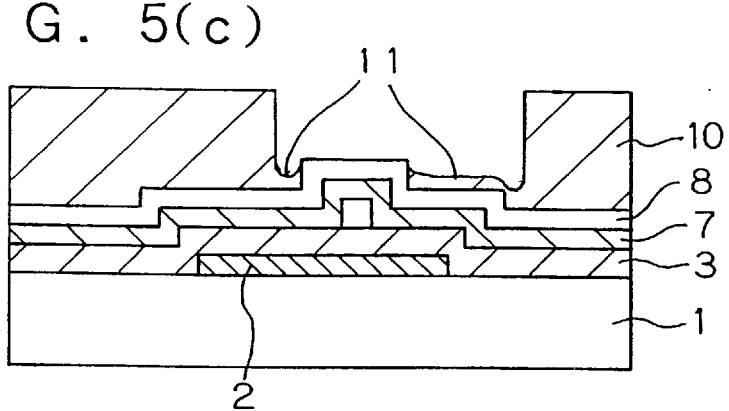
Figure 6:
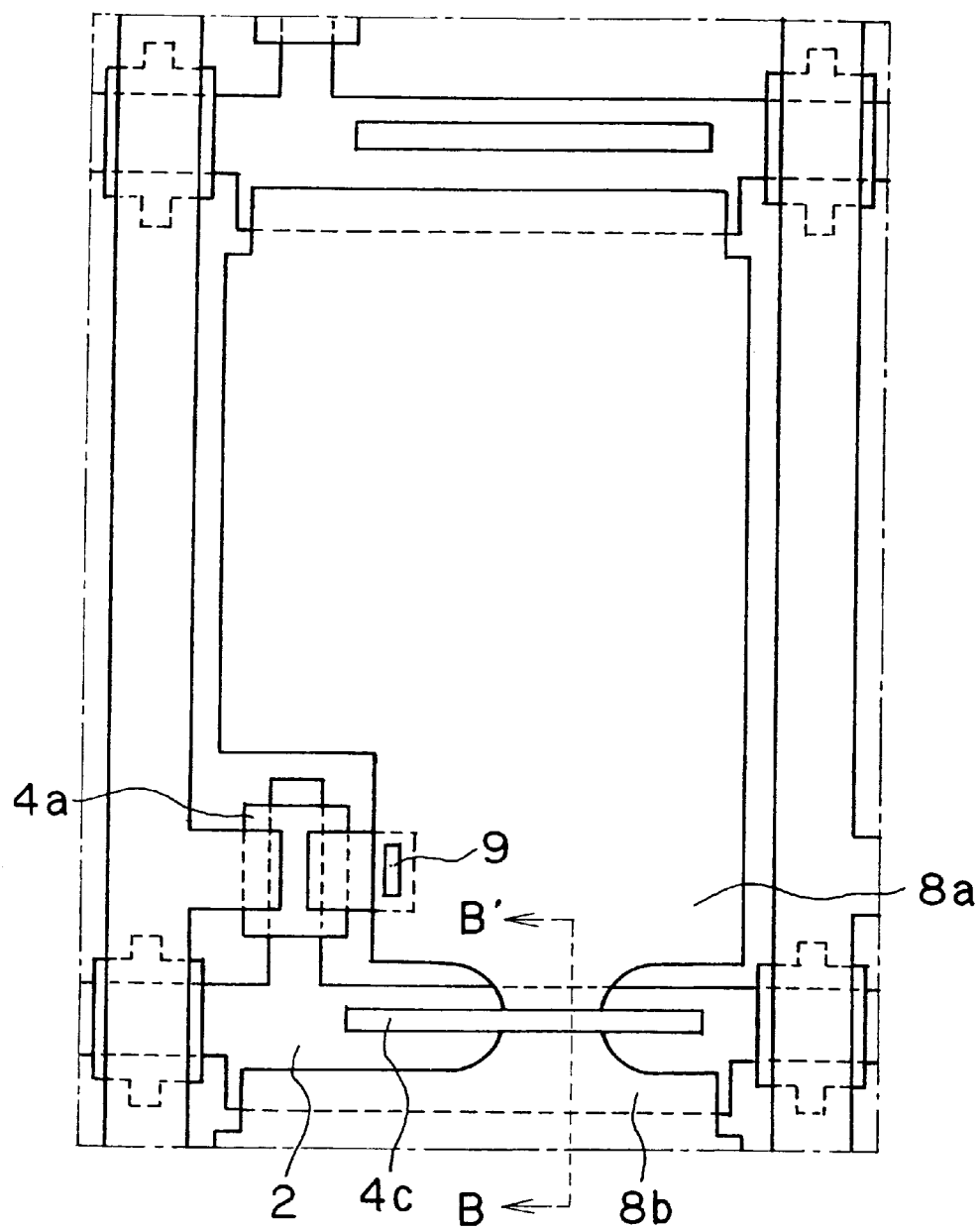
FIG. 6 is a plan view for illustrating the operation and the meritorious effects of the embodiment of the present invention.
Figure 7A:
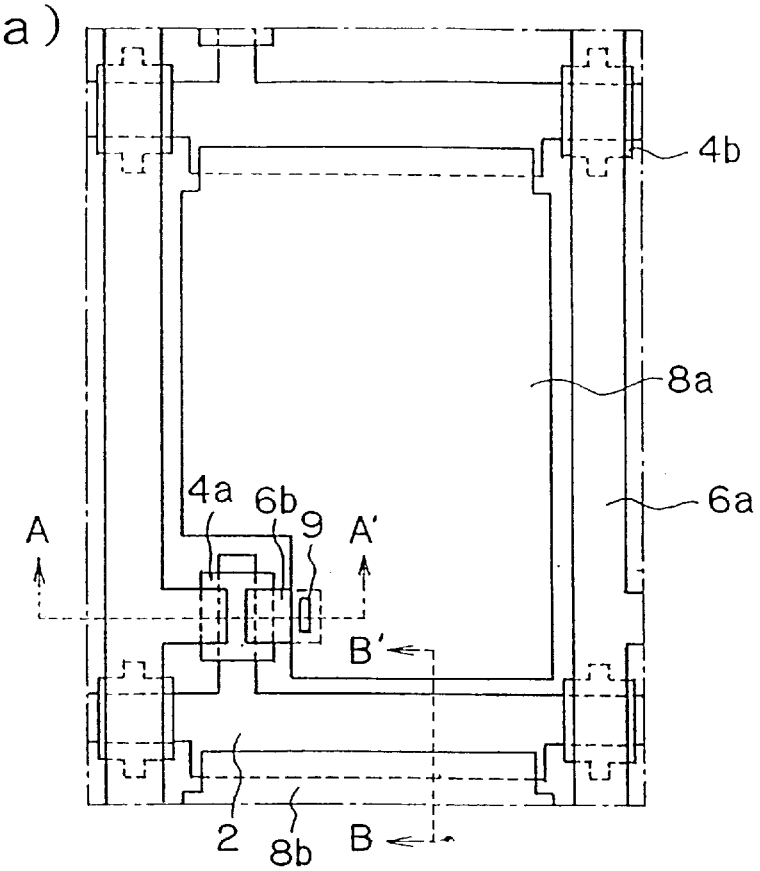
FIGS. 7a, 7b and 7c are a plan view, a cross-sectional view along line A–A' of FIG. 7a and a cross-sectional view along line B–B' of FIG. 7a, respectively.
Figure 7B:
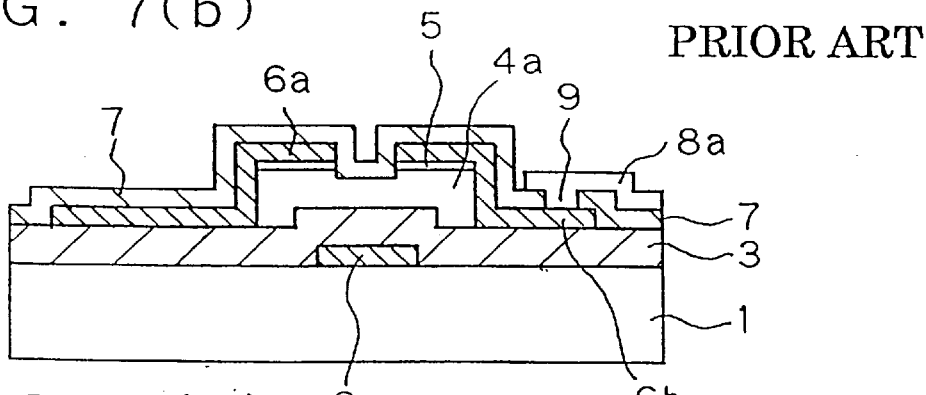
Figure 7C:
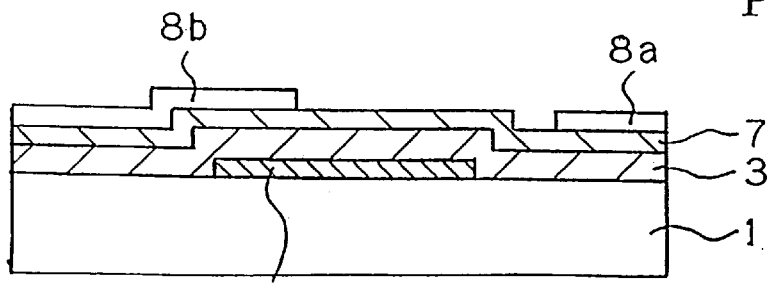
Figure 8A:
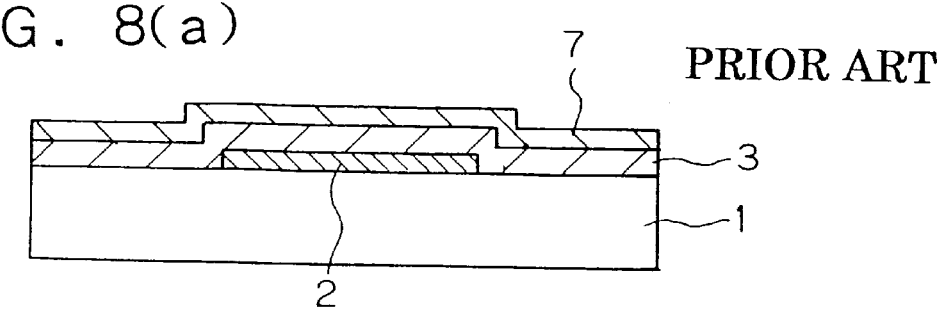
FIGS. 8(a) to 8(d), illustrating the problems of the first conventional technique, is a cross-sectional view for illustrating the production process thereof step-by-step.
Figure 8B:
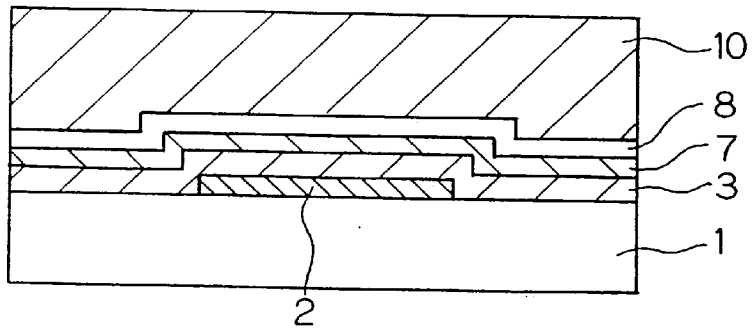
Figure 8C:
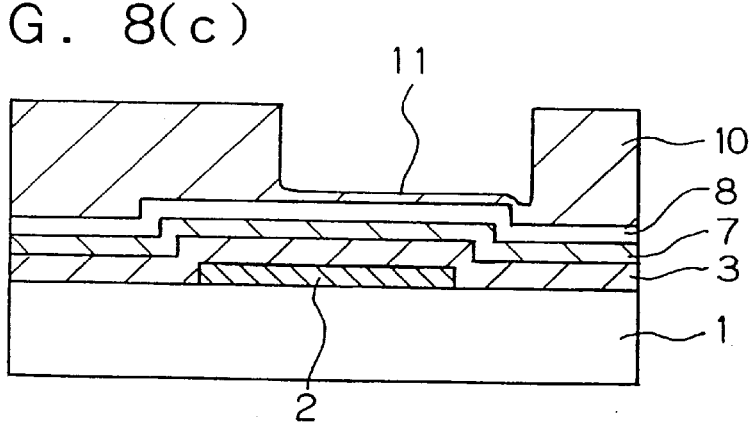
Figure 8D:
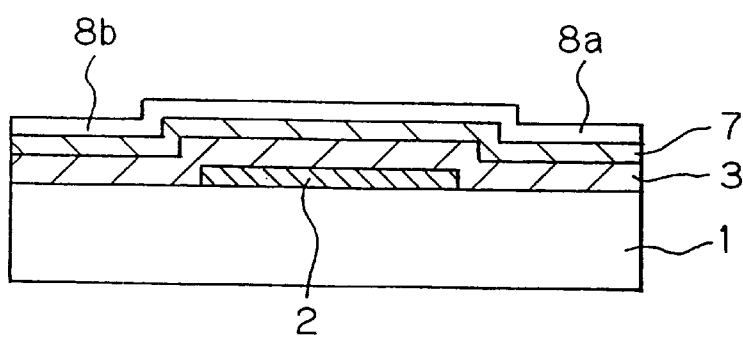
Figure 9:
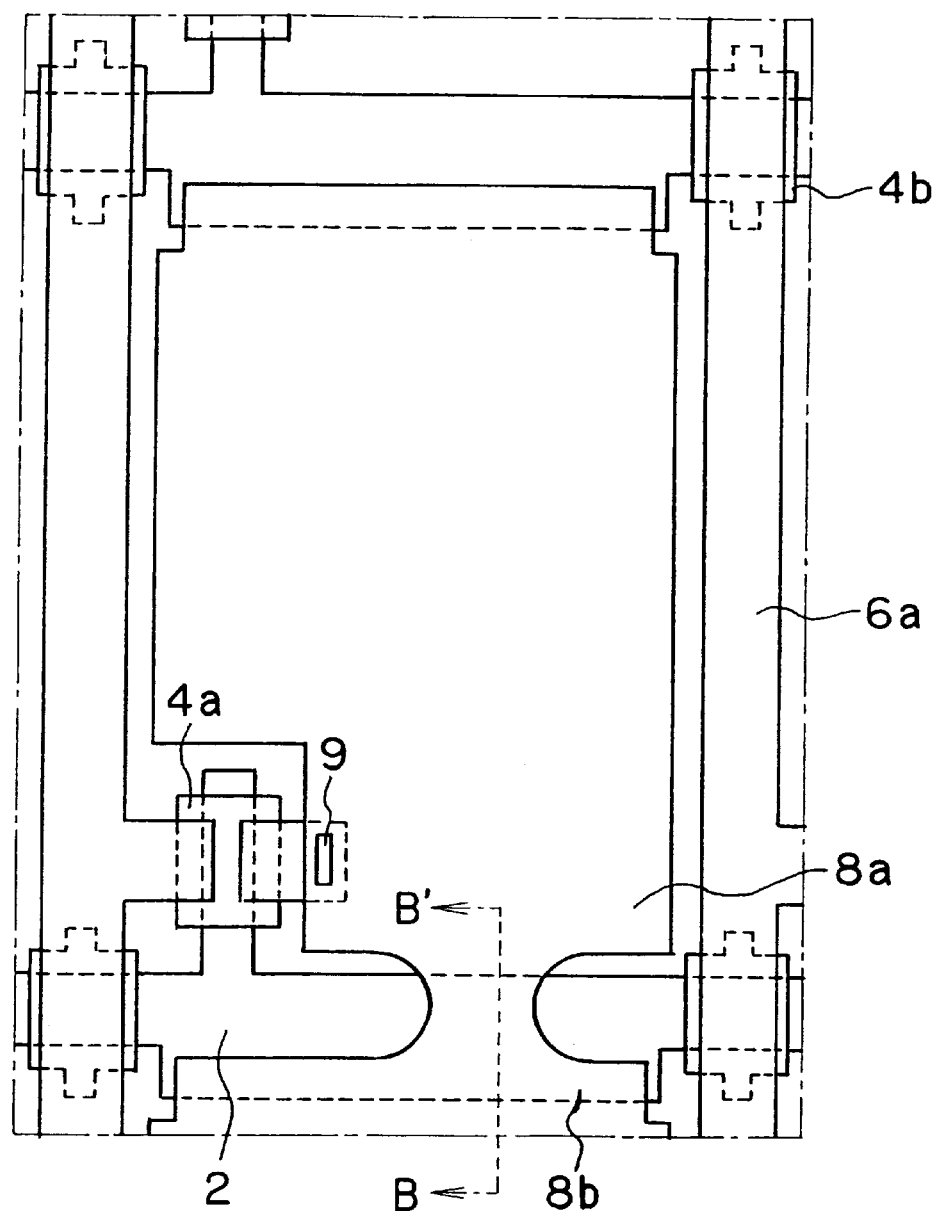
FIG. 9 is a plan view for illustrating a problem of the first conventional technique.
Figure 10:
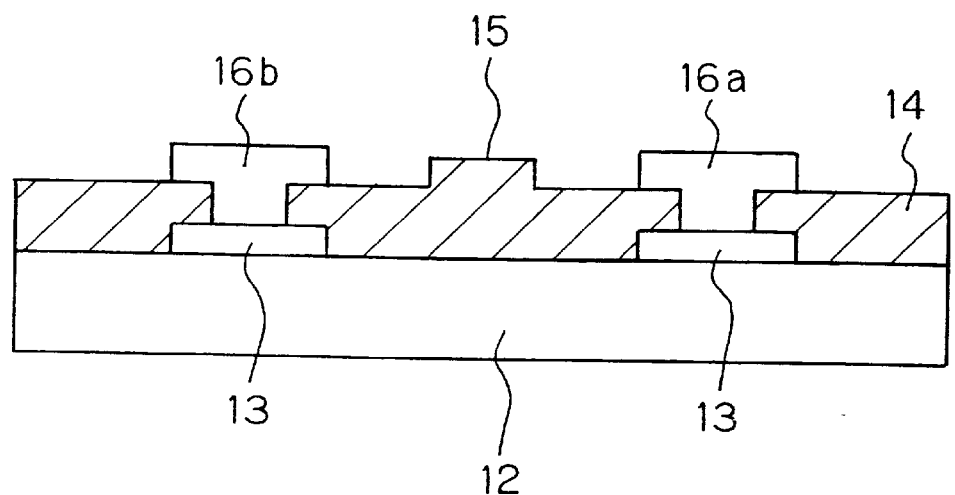
FIG. 10 is a cross-sectional view for illustrating the second conventional technique.
Figure 11:
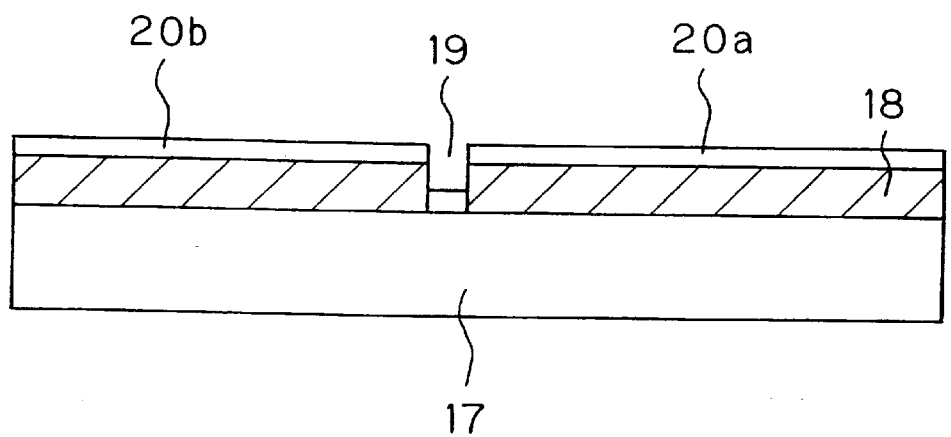
FIG. 11 is a cross-sectional view for illustrating the third conventional technique.

An ITO film 8 is formed and a photoresist film 10 then is formed, as shown in FIG. 5b. There are occasions wherein photoresist film residuals 11 are formed on light exposure and development, as shown in FIG. 5c.

However, in the present embodiment, since the amorphous silicon semiconductor film 4c is formed on the gate metal film 2 to form the protrusion, the photoresist film is not liable to be left on the protrusion.

Figure 5D:
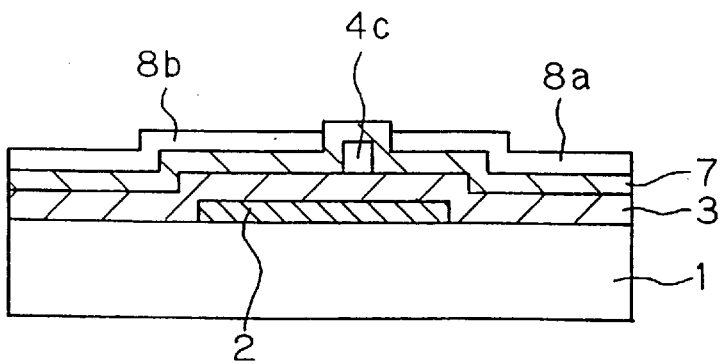

If the ITO film 8 is etched in this state, the ITO films 8a, 8b are separated from each other, as shown in FIG. 5d.

That is, the ITO films 8a, 8b, constituting the pixel electrodes, are separated from each other by an elongated island-like pattern of the amorphous silicon film 4c, as shown in FIG. 6. Thus, even if, in preset embodiment, photoresist film residuals are produced, it is possible to prevent the lowering of the production yield caused by shorting across the pixel electrodes.

Moreover, since the elongated pattern of the amorphous silicon film 4c can be formed simultaneously with the formation of the active area of the thin film field-effect transistors, the number of production steps is not increased thus assuring an inexpensive active matrix TFT elements array.

The meritorious effect of the invention is summarized as follows.

As discussed above, the present invention realizes the following meritorious effects:

The first meritorious effect of the present invention is that the production yield can be improved by preventing shorting across the pixel electrodes.

The reason is that the photoresist film residuals are not likely to be produced by the provision of a protrusion of amorphous silicon film between the pixel electrodes.

The second effect of the present invention is that, since the number of production steps is not increased, there can be provided an inexpensive active matrix TFT electrodes array.

The reason is that, according to the present invention, the amorphous silicon film forming a protrusion can be patterned simultaneously with the patterning of the active area of the thin film field-effect transistors.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. An active matrix TFT elements array on a light-transmitting insulating substrate, comprising gate lines, drain lines, thin film field-effect transistors having an amorphous silicon layer, and pixel electrodes, said drain lines being formed in a layer above said gate lines, wherein an amorphous silicon semiconductor film, of a same layer as said amorphous silicon layer of said thin film field-effect transistors is provided in a gate line lengthwise direction on at least one of said gate lines, in the shape of an island of a length not longer than an interval between said drain lines, between pixel electrodes that are adjacent each other along a lengthwise direction of said drain lines.

2. An active matrix TFT elements array having drain lines and gate lines, wherein a protrusion is formed on at least one of said gate lines, between pixel electrodes disposed adjacent each other along a lengthwise direction of the drain lines, so as to leave a pattern of an elongated semiconductor film that does not overlap the pixel electrodes.

3. An active matrix TFT elements array, comprising signal lines and control lines arranged in a lattice configuration on an insulating substrate, a first signal electrode connected to said signal lines at an intersection of said signal lines and control lines, thin film transistors having gate electrodes connected to said control lines, said thin film transistors having a semiconductor layer, and pixel electrodes connected to second signal electrodes of said thin film transistors, wherein a protrusion is formed as an elongated island-like pattern on at least one of said control lines between pixel electrodes disposed adjacent each other along a lengthwise direction of the signal lines.

4. An active matrix TFT elements array as claimed in claim 3, wherein said semiconductor layer is of a same layer as the semiconductor layer constituting said thin film transistors, and wherein said insulating film is of a same layer as a gate insulating film of said thin film transistors.

5. An active matrix TFT elements array as claimed in claim 3, wherein a length of said island-like pattern along the control lines is shorter than an interval between adjacent signal lines.

6. An active matrix TFT elements array as claimed in claim 5, wherein said thin film transistors are transistors of an inverted staggered structure containing an amorphous silicon semiconductor film.

7. An active matrix TFT elements array as claimed in claim 3, wherein an insulating film is formed for extending said protrusion along said control lines.

8. A display comprising an active matrix TFT elements array, said array having gate lines, drain lines, thin film field-effect transistors having an amorphous silicon layer, and pixel electrodes, on a light-transmitting insulating substrate, said drain lines being formed in a layer above said gate lines, wherein an amorphous silicon semiconductor film, of the same layer as said amorphous silicon layer of said thin film field-effect transistors, is provided on said gate lines in the shape of an island of a length not longer than an interval between said drain lines, provided between pixel electrodes disposed adjacent each other along a lengthwise direction of the drain lines.

9. A display comprising an active matrix TFT elements array having drain lines and gate lines, wherein a protrusion is formed between pixel electrodes disposed adjacent each other along a lengthwise direction of the drain lines, said protrusion formed on at least one of said gate lines in a pattern of an elongated semiconductor film that does not overlap the pixel electrodes.

10. A display comprising an active matrix TFT elements array, comprising signal lines and control lines arranged in a lattice configuration on an insulating substrate, a first signal electrode connected to said signal lines at an intersection of said signal lines and said control lines, thin film transistors having gate electrodes connected to said control lines and having a semiconductor layer, and pixel electrodes connected to second signal electrodes of said thin film transistors, wherein a protrusion is formed as an elongated island-like pattern on at least one control line of said control lines, formed between pixel electrodes disposed adjacent each other along a lengthwise direction of the signal lines.

11. A display as claimed in claim 10, wherein said thin film transistors further comprise a gate insulating film, and wherein, in said array, said semiconductor layer is of a same layer as said semiconductor layer of said thin film transistors, and wherein said insulating film is of a same layer as said gate insulating film of said thin film transistors.

12. A display as claimed in claim 10 wherein, in said array, a length of said island-like pattern along a lengthwise direction of the control lines is shorter than an interval between adjacent signal lines.

13. A display as claimed in claim 12, wherein said thin film transistors are transistors of an inverted staggered structure containing an amorphous silicon semiconductor film.

14. An active matrix TFT elements array as claimed in claim 10, wherein an insulating film is formed for extending said protrusion along said at least one control line.

* * * * *